March 8, 1960     H. A. LONGINO     2,927,383
BALLOON WORLD SATELLITE
Filed June 3, 1958     2 Sheets-Sheet 1
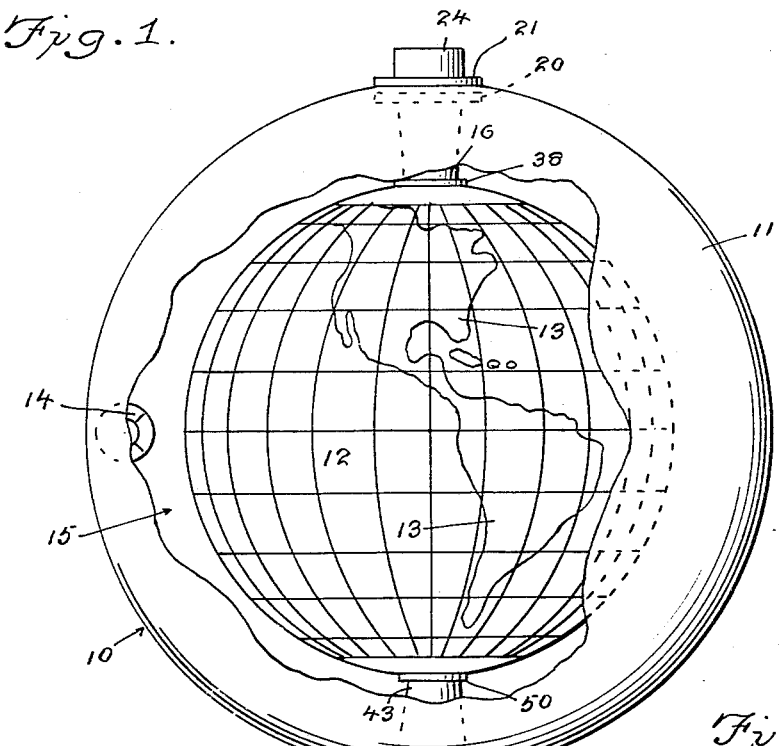
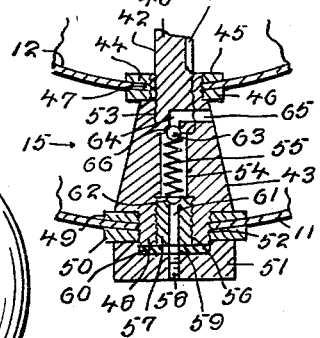
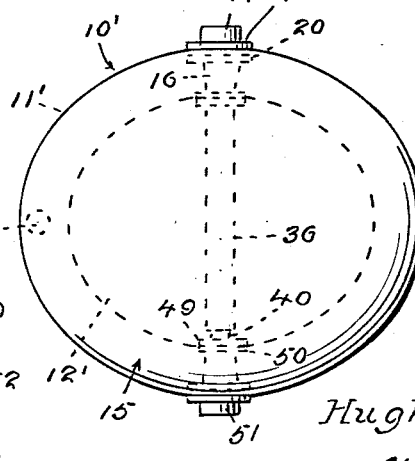
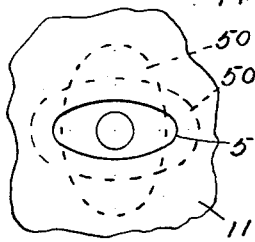
INVENTOR.
Hugh A. Longino
BY *Victor J. Evans & Co.*
ATTORNEYS

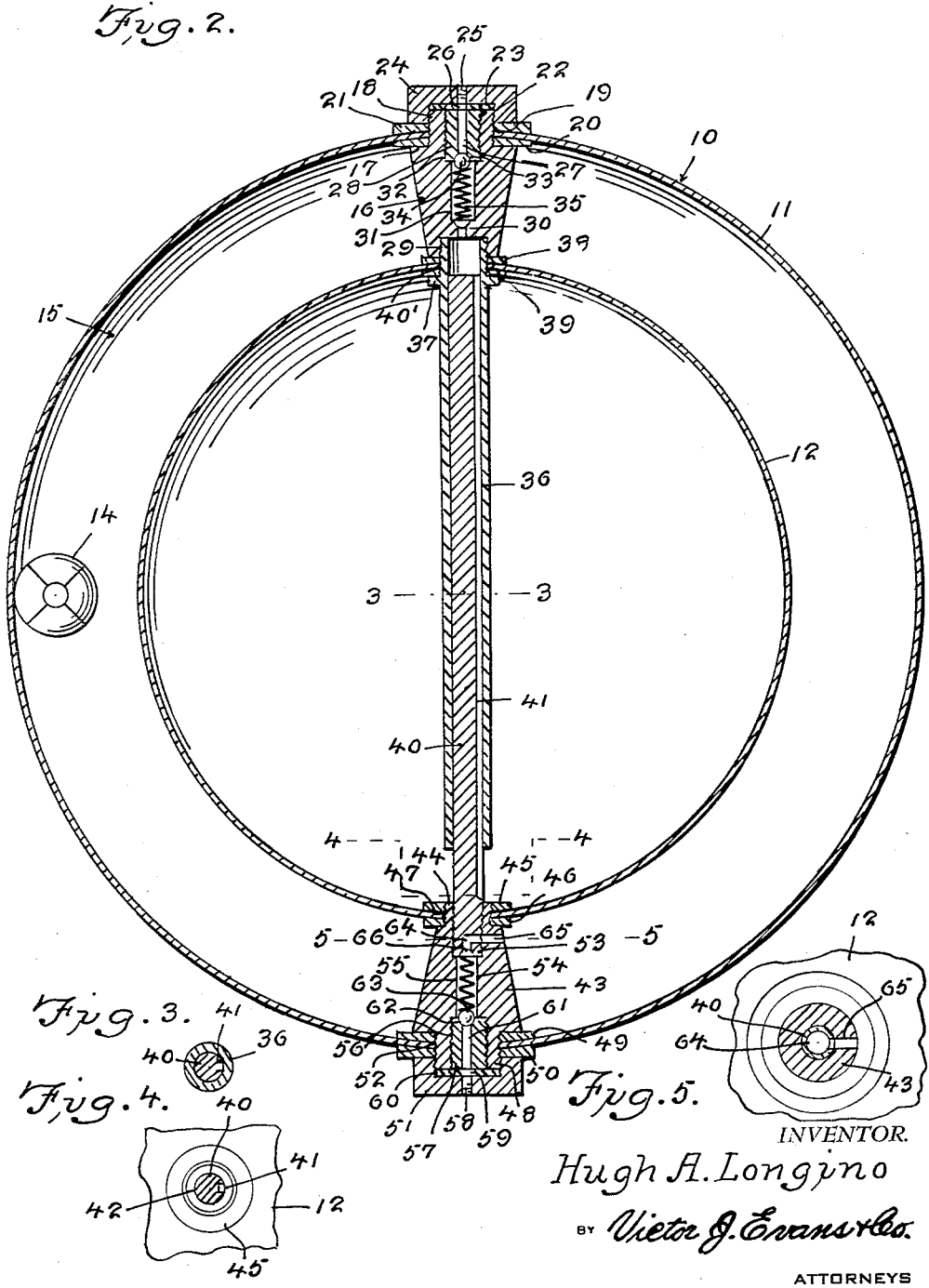

United States Patent Office 2,927,383
Patented Mar. 8, 1960

2,927,383

BALLOON WORLD SATELLITE

Hugh A. Longino, McLean, Tex.

Application June 3, 1958, Serial No. 739,532

3 Claims. (Cl. 35—46)

This invention relates to a device for simulating the movement of a body such as a satellite around the earth or world.

The object of the invention is to provide a device which is in the nature of an educational or scientific assembly so that various types of scientific principles or phenomena can be accurately demonstrated and explained, and wherein according to the present invention there is provided inner and outer members which have a movable satellite or object arranged therebetween, whereby upon proper manipulation of the device, the satellite can be caused to move through the space between the inner and outer members so as to provide recreation and amusement as well as education to the user or onlookers.

This invention is an improvement over the devices shown in my prior patents, such as my prior Patents 2,651,879, and 2,663,968.

The principal object of the present invention is to provide a device which consists of members that are arranged to simulate the earth and wherein one of the members is adapted to have indicia or markings thereon which represent or simulate the various parts of the world, and wherein there is provided a satellite which is adapted to be caused to travel around the inner earth resembling member so as to provide a source of education as well as recreation to the persons using the device.

These and other objects and features of the invention will be more readily understood and appreciated from the following detailed description of a preferred embodiment selected for purposes of illustration and shown in the accompanying drawings, in which:

Figure 1 is an elevational view of the present invention, with parts of the outer member broken away for purposes of clarity.

Figure 2 is an enlarged sectional view taken through the device.

Figure 3 is a sectional view taken on the line 3—3 of Figure 2.

Figure 4 is a sectional view taken on the line 4—4 of Figure 2.

Figure 5 is a sectional view taken on the line 5—5 of Figure 2.

Figure 6 is an elevational view illustrating a modification wherein the body members are elliptical in formation rather than being spherical.

Figure 7 is a fragmentary sectional view of a further modification.

Figure 8 is a view illustrating certain constructional details of the present invention.

Referring in detail to the drawings, and more particularly to Figures 1 through 5 of the drawings, the numeral 10 indicates the device of the present invention which comprises an outer body member 11 of transparent material, and arranged within the body member 11 is an inner body member 12. The body member 12 is adapted to have indicia or markings thereon such as indicia 13 which indicates the various countries, oceans or other portions of the world, as for example as shown in Figure 1.

Movably mounted in the space 15 between the body members 11 and 12 is a spherical satellite or object 14.

There is further provided a first support member which is indicated generally by the numeral 16, and the support member is provided with an outer cutaway portion which defines a reduced diameter end portion 18, and the end portion 18 extends through an opening 19 in the outer body member 11. The cutaway portion defines in the support member 16 a shoulder 17, and the numerals 20 and 21 designate sealing members which are mounted on the reduced diameter end portion 18, the sealing members 20 and 21 being arranged on opposite sides of the body member 11.

The reduced diameter end portion 18 is threaded as at 22, and a disk or gasket 23 is arranged as shown in Figure 2. The numeral 24 indicates a cap which is arranged in threaded engagement with the threaded portion 22, and the cap 24 is provided with an opening 25 that registers with an opening 26 in the disk 23. There is further provided a registering opening 27 which is arranged in a plug 28.

The support member 16 is provided with a longitudinally extending passageway, and this passageway includes a first section 29 which communicates with a smaller section 30, and the section 30 communicates with a larger section 31, and the third or larger section 31 communicates with an enlarged fourth section 32. The plug 28 is arranged in the fourth section 32. The inner end of the plug 28 is shaped to define a valve seat 33, and a ball or valve 34 is mounted for movement into and out of opened or closed relation with respect to the valve seat 33. A coil spring 35 is arranged in the section 31, and the coil spring 35 abuts the ball 34 for normally maintaining or urging the ball 34 into closed relation with respect to the valve seat 33 and opening 27.

There is further provided a hollow tube which is indicated by the numeral 36, and the tube 36 has one end thereof arranged in engagement with the first section 29 of the passageway in the support member 16. The tube 36 extends through an opening 40' in the body member 12, and a flange 37 extends outwardly from the tube 36. The numerals 38 and 39 indicate sealing members which are mounted on the tube 36, and the sealing members 38 and 39 are arranged on opposite sides of the inner body member 12.

There is further provided a core 40 which telescopically or slidably engages the inner surface of the tube 36, and the core 40 is provided with a longitudinally extending groove 41, and the groove 41 communicates with the interior of the body member 12. The numeral 43 indicates a second support member which includes an inner tip 44 that has sealing members 45 and 46 mounted thereon, and the sealing members 45 and 46 are arranged on opposite sides of the inner body member 12. The inner body member 12 is provided with an opening 47 through which extends the tip 44.

The second support member 43 is also provided with a reduced diameter outer end portion 48, and sealing members 49 and 50 are mounted on the end portion 48, the sealing members 49 and 50 being arranged on opposite sides of the outer body member 11. A cap 51 is threaded or otherwise connected to the reduced diameter portion 48, and there is provided on the outer body member 11 an opening 52 through which extends the portion 48.

The second support member 43 is provided with a longitudinally extending passageway which includes a first section 53 that has an end of the core 40 arranged in engagement therewith, and the passageway also includes a second section 54 which has a coil spring 55 arranged therein. A third section 56 communicates with the second section 54, and a plug 57 is arranged in the third section 56. The cap 51 is provided with an opening 58 that registers with an opening 59 in a sealing disk 60, and there is further provided a registering opening 61 in the plug 57. The inner end of the plug 57 is shaped to define a valve seat 62, and a ball valve 63 is engaged by the spring 55, and the ball valve 63 is mounted for movement into and out of opened or closed relation with respect to the valve seat 62 and opening 61. The numeral 64 indicates a port in the core 40 which registers with a port 65 in the support member 43, whereby a means is provided for establishing communication between the space 15 and passageway in the support member 43.

Referring now to Figure 6 of the drawings, there is illustrated a modified device which is indicated generally by the numeral 10', and the device 10' includes an outer body member 11' of elliptical formation, and an inner body member 12' of elliptical formation. Thus, these body members 11' and 12' have elliptical formations rather than spherical formations as do the previously described body members 11 and 12. Otherwise, the use and construction of the device shown in Figure 6 is the same as that shown in Figures 1 through 5. In Figure 6, the snug fitting of the core 40 in the tube 36, will permit the elliptical formation to be provided. Thus, the elliptical formation can be brought about by lengthening or shortening the distance between the poles of Figure 2, at the north-south sections of No. 12. Pressure of the core 40 within the tube 36 will make this possible, as for example when both the members 11 and 12 are made of flexible material. Otherwise these members will remain spherical.

Referring now to Figure 7 of the drawings, there is illustrated a modified arrangement wherein the position of the ball valve 63 is reversed. Thus, in Figure 7 the ball valve 63 is normally held into closing relation with respect to a valve seat 66 by means of the spring 55. This is different from the arrangement shown in Figure 2 for example wherein the ball valve 63 is mounted for movement into and out of engagement with the valve seat 62.

Referring now to Figure 8 of the drawings, there is illustrated the manner of inserting a member such as the washer 49 or 50 through an opening such as the opening 52 which may be arranged in the member 11 when the member 11 is of rigid material. Thus, some provision must be made for inserting the washer 50 through such an opening 52, especially when the member 11 is of rigid material. This difficulty is adapted to be overcome by making the opening 52 oblong and by making the washers such as the washers 49 and 50 of the same form but sufficiently large to extend well over onto the surface of the lip of the opening in the rigid balloon 11. The sealing washer can then be inserted lengthwise into the balloon 11 or member 11 and then turned over so as to contact the surface sufficiently to seal the air either in or out of the member 11 as shown in Figure 8 by dotted lines.

From the foregoing, it is apparent that there has been provided a device which will not only be highly educational, but will also provide a convenient source of recreation and pleasure to the user or onlookers. When using the device of Figures 1 through 5 as indicated by the numeral 10, it will be seen that with the parts arranged as shown in Figures 1 and 2 for example, the user can grip the device in his or her hands and then by shaking or oscillating or moving the device, the satellite or object 14 can be caused to travel around through the space 15 between the body members 11 and 12 and with the inner body member 12 having indicia 13 thereon representing the various parts of the earth, it will be seen that the satellite 14 will orbit through the space 15 in a highly realistic and educational manner. The outer member 11 is adapted to be made of transparent material so that a person can readily observe the position that the member 14 occupies in relation to the indicia 13 on the inner body member 12.

There is further provided the previously described valve assemblies which permit the user to readily supply air or vacuum pressure to the space 15 or into the interior of the body member 12. Thus, as shown in Figure 2 for example, air from a suitable source of supply can be supplied under pressure as for example air from a pump can be directed through the opening 25, and this air will pass through the opening 25 and then through the opening 26 and then through the opening 27 and this air will move the ball 34 away from its seat 33 so that the air under pressure can then pass through the section 30 and then through the groove 41 so that this air can be used to expand the inner body member 12 as for example when the inner body member 12 is made of flexible material such as rubber or plastic.

Similarly, air can be supplied from a suitable source of supply such as a pump through the opening 58, and this air under pressure will pass through the opening 59, and then through the section 61 so as to move the ball 63 away from its seat 62, whereby this air under pressure can then pass through the section 54, and then through the port 64 and then through the port 65 so that when desired, this air can be used for increasing the air pressure in the zone or space 15 which will have the effect of decreasing the size of the inner body member 12 when the body member 12 is made of flexible material.

Furthermore, if desired a suitable prong or fin member can be inserted through the various previously described openings so as to move the balls such as the balls 34 or 63 away from their seats so as to permit air to be bled from the interior of the body member 12 or from the space 15. This construction thereby permits the members 11 and 12 to be varied in size according to the dictates of the user.

The device is further provided with the previously described sealing members which serve to insure that there will be a tight fit between the body member 11 and the adjacent parts so that there will be no leakage of air therearound or therethrough.

Instead of making the body members 11 and 12 of spherical shape, they may be formed in the shape illustrated in Figure 6 so that they may have an elliptical formation as indicated by the numerals 11' and 12'.

In the modification of Figure 7, the provision of the ball valve 63 is reversed so that with the arrangement as shown in Figure 7, a suitable vacuum pump or the like can be connected into the opening 58 whereby when vacuum pressure is created, the ball 63 will be sucked or pulled away from its valve seat 66 so that air in the space 15 can be readily sucked out of the space 15 as for example when the size of the members 11 or 12 is to be varied or for any desired purpose.

The valve heads or assemblies shown in Figure 2 are the same as that shown in Figure 7 with the exception of the air intake or arrangement of the ball 63 so that by having parts of uniform construction, the manufacture or fabrication thereof will be simplified.

With the present invention, a person can simulate conditions in space above the earth's surface, so as to illustrate conditions which exist in the realm where missiles circle the earth. For example, with the outer member 11 made of a rigid material, air can be pumped out of the space 15 so as to provide a means of studying reactions on the inner member 12 as for example when such studies are being made for scientific or educational purposes. The present invention is especially suitable for demonstrating or educating younger people by way of visual education, as to the workings of objects or articles in outer space. The indicia 13 may be arranged on the inner member 12 in any suitable manner, as for example by means of printing, stamping or the like. The present invention also utilizes the miniature satellite 14 and there is also provided a means for inflating and deflating the various balloons or body members. Also, the valves provide a means whereby air can be automatically sealed in or out of the ballons or body members. The various sealing members may be made of a suitable yieldable material such as rubber or plastic so that the air will be sealed into the desired zones without leakage. These sealing members are adapted to be used in pairs and are clamped in their proper positions so that they will not accidentally become loose. The valve balls are normally held in position by means of coil springs and in certain instances an outer space condition can be created by forming a vacuum inside the outer ballon so as to simulate a real satellite space condition. The valve seats are preferably shaped in a concave formation so as to snugly receive the ball valves therein. The inner member 12 is made of flexible material, whereas the outer member may be made of rigid material when a vacuum is desired in the outer body member, otherwise it too may also be made of flexible material. The device may be held in the hands and moved in a proper manner so as to cause the satellite 14 to orbit around as previously described.

Thus, according to the present invention, two balloons or body members are connected for the purpose of forming a space similar to the earth's air sheet, or realm and the satellite is adapted to circle the inner member. Thus, a person will be able to trace visually on a map of the earth, the course of an object or satellite or missile as it travels its path around the earth and by sliding the members 36 and 40 relative to each other, the device can be moved from a shape as shown in Figure 2 to an elliptical formation as shown in Figure 6 so as to simulate conditions such as changing of seasons, or time of the year. The device can serve both as a toy and as a useful instrument and it can be arranged or constructed so that it is scientifically accurate. Thus, the device will help make such scientific studies more interesting to students and the parts can be made of any suitable material and in different shapes or sizes. Preferably the body members are made of a suitable material such as rubber or plastic which are resistant to rough handling. The members 36 and 40 act as an imaginary axis through the earth. The support members not only serve as parts of the valve assemblies, but also maintain the members 11 and 12 spaced sufficiently apart so as to permit the necessary freedom of travel of the satellite 14.

Minor changes in shape, size and rearrangement of details coming within the field of invention claimed may be resorted to in actual practice, if desired.

I claim:
1. In a device of the character described, an outer body member, an inner body member arranged within said outer body member, and a movable member freely movable between said inner and outer body members, said inner body member having indicia thereon simulating portions of the earth, said outer body member being transparent, and means for supplying air or vacuum pressure to the interior of the inner body member and to the space between the inner and outer body members.

2. In a device of the character described, an outer body member of transparent material, an inner body member arranged within said outer body member, said inner body member having indicia thereon representing the earth, a spherical satellite freely movable between said inner and outer body members, a first support member provided with an outer cutaway portion defining a reduced diameter end portion and a shoulder, there being an opening in said outer body member for the projection therethrough of said reduced diameter end portion, a first sealing member mounted on said reduced diameter end portion and abutting said shoulder, said first sealing member being arranged contiguous to the inner surface of said outer body member, a second sealing member arranged contiguous to the outer surface of said outer body member and mounted on said reduced diameter end portion, said reduced diameter end portion having a threaded outer end, a cap arranged in threaded engagement with said threaded end, there being a disk positioned between said cap and the reduced diameter end portion, said support member being provided with a longitudinally extending passageway, said passageway including a first section, a second section of reduced size communicating with said first section, a third section communicating with said second section, said passageway further including an enlarged fourth section communicating with said third section, a plug seated in said fourth section, there being registering openings in said cap, disk and plug, there being a valve seat in the inner portion of the plug, a ball mounted for movement into and out of engagement with said valve seat, a coil spring positioned in the third section of said passageway and abutting said ball.

3. In a device of the character described as in claim 2, wherein a tube is provided that extends through said inner body member and is seated in the first section of said passageway, an annular flange extending outwardly from said tube, sealing members arranged contiguous to said flange and arranged on opposite sides of the inner body member, a core telescopically projecting into said tube, there being a longitudinally extending groove in said core, a second support member having an inner tip projecting through said inner body member, sealing members mounted on said tip and arranged on opposite sides of the inner body member, said second support member further including an outer reduced diameter end portion, sealing members mounted on said last named reduced diameter end portion and arranged on opposite sides of the outer body member, a cap connected to the last named reduced diameter end portion, there being a longitudinally extending passageway in said second support member, said last named passageway including a first section having an end of said core seated therein, a second section communicating with said first section, said second section terminating in an enlarged third section, a plug arranged in said last named third section, there being registering openings in said last named cap and plug, said last named plug being provided with a valve seat, a ball mounted for movement into and out of engagement with said last named valve seat, a coil spring arranged in the last named second section and abutting the adjacent ball, the adjacent end of the core and the adjacent portion of said second support member being provided with ports which establish communication between the passageway in the second support member and the space between the inner and outer body members.

References Cited in the file of this patent

UNITED STATES PATENTS

| | | |
|---|---|---|
| 320,999 | Berneike | June 30, 1885 |
| 952,119 | Van Keuren | Mar. 15, 1910 |
| 1,745,576 | Kempien | Feb. 4, 1930 |
| 2,358,075 | Kissinger | Sept. 12, 1944 |
| 2,635,387 | Anderson | Apr. 21, 1953 |
| 2,797,500 | Fisk | July 2, 1957 |

FOREIGN PATENTS

| | | |
|---|---|---|
| 341,719 | Great Britain | Jan. 22, 1931 |